(12) United States Patent
Carlson

(10) Patent No.: US 6,215,625 B1
(45) Date of Patent: Apr. 10, 2001

(54) APPARATUS AND METHOD FOR ADHESIVE BRIDGE SUSPENSION ATTACHMENT

(75) Inventor: Carl J. Carlson, Pleasanton, CA (US)

(73) Assignee: Read-Rite Corporation, Milpitas, CA (US)

( * ) Notice: Subject to any disclaimer, the term of this patent is extended or adjusted under 35 U.S.C. 154(b) by 0 days.

(21) Appl. No.: 09/225,287

(22) Filed: Jan. 4, 1999

(51) Int. Cl.⁷ .................................................. G11B 5/48
(52) U.S. Cl. ................................. 360/244.7; 360/245.2
(58) Field of Search .............................. 360/104, 244.7

(56) References Cited

U.S. PATENT DOCUMENTS

| | | | |
|---|---|---|---|
| 5,759,418 | * | 6/1998 | Frater .................................... 360/104 |
| 5,808,835 | * | 9/1998 | Fujiwara ................................ 360/104 |
| 5,877,919 | * | 3/1999 | Foisy .................................... 360/104 |
| 6,021,023 | * | 2/2000 | Hillman .............................. 360/244.7 |

\* cited by examiner

*Primary Examiner*—A. J. Heinz
(74) *Attorney, Agent, or Firm*—Nathan N. Kallman

(57) ABSTRACT

An apparatus and method for assembling baseplates, which are joined to head suspensions, to actuator arms of an E-block for use in disk drives employ an assembly fixture for orienting and holding the head suspensions with reference to a pivot bearing formed in the E-block. An adhesive is interposed in a gap formed between each baseplate and corresponding actuator arm to maintain the suspensions in alignment relative to the pivot bearing. The assembly fixture includes clamps for maintaining the suspensions in a proper orientation. Each suspension has a locating surface that is planar with the gap for alignment of the suspensions.

13 Claims, 4 Drawing Sheets

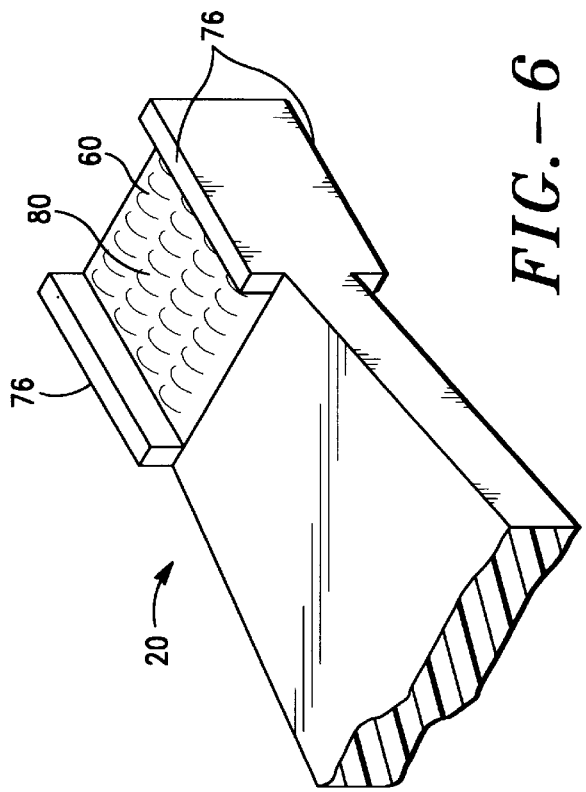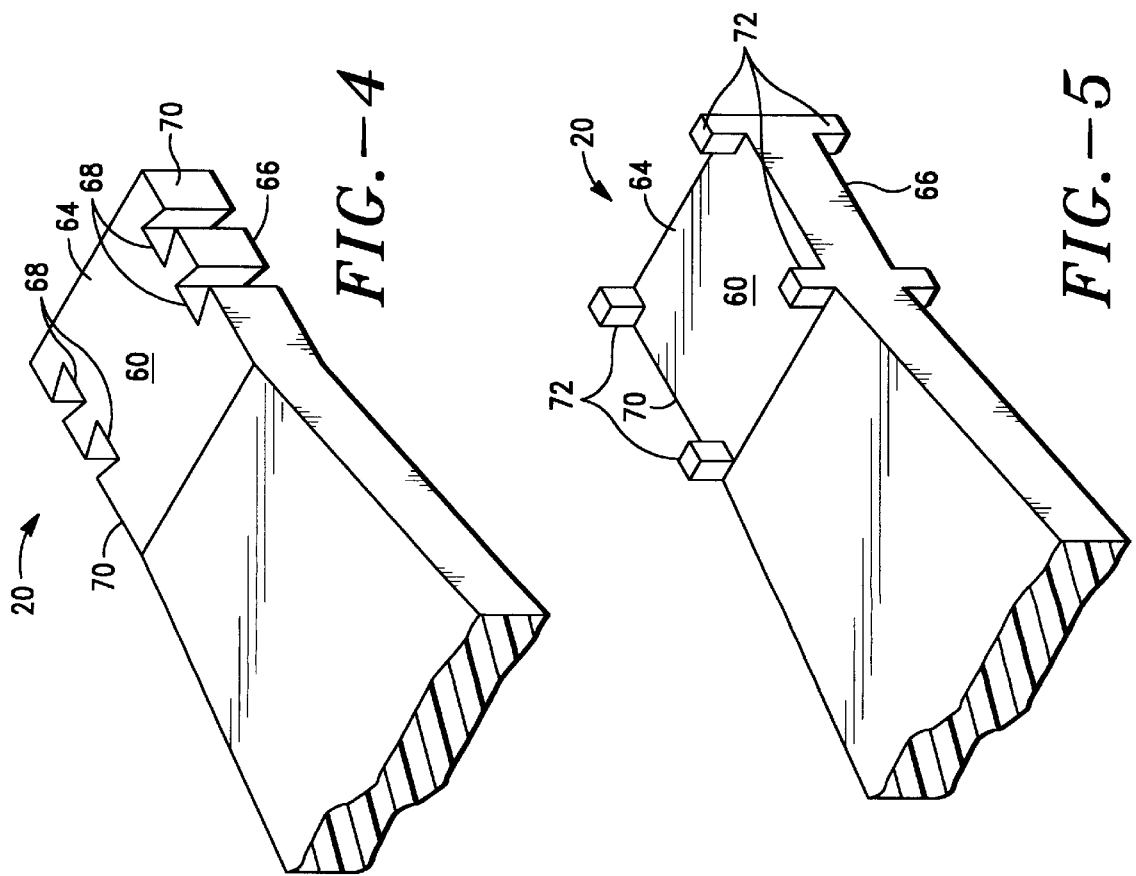

APPARATUS AND METHOD FOR ADHESIVE BRIDGE SUSPENSION ATTACHMENT

FIELD OF THE INVENTION

The present invention relates to hard disk drives and in particular to means of attaching a magnetic head suspension assembly to an E-block.

BACKGROUND OF THE INVENTION

Hard disk drives typically include multiple disks that have a magnetic memory storage surface for storing data. A magnetic head including a read/write transducer passes over the disk surface for reading and writing data. The transducer must be precisely positioned on particular disk tracks in a consistent way to quickly and reliably read and write the data. In the disk drive industry, there is a trend to fit more and more disk tracks per unit of disk surface to maximize the disk storage capacity. Accordingly, precise positioning of the transducer with respect to the disk surface is critical.

Prior art hard disk drives have an E-block that pivots on a pivot bearing. The E-block has multiple actuator arms. Suspensions attach to the actuator arms to suspend the magnetic heads above the disk surface. The suspensions are typically spring loaded, having a particular gram load, to enable the heads to maintain a desired flying height just above the spinning disk surface. Changes in this gram load affect the flying height of the head.

Changes in the gram load are influenced by many factors. These factors include misalignment and deformation of critical components. For example, the suspension and actuator arm may misalign during assembly. The pivot bearing of the E-block may misalign within the E-block. Bearing and actuator arm defects may cause misalignment. Pivot bearing inner race runout, bore inaccuracies in the E-block, or bearing installation errors are examples of common causes for bearing and E-block misalignment that can result in gram load variations. The actuator arm tips may end up varying from a desired height and orientation, causing attached suspensions to have varying gram loads.

Often, gram load changes are associated with the process of attaching the suspension to an actuator arm. Swaging is the most common method of attaching the suspension to the actuator arm and involves pressing swage balls through the hub of a suspension baseplate. The swage balls expand the hub against the actuator arm to hold the suspension and actuator arms together. Pressing swage balls though the hub may distort the baseplate, changing the suspension gram load.

There are known ways of adhesively bonding a suspension to an actuator arm to overcome the undesirable effects of swaging. For example, a doughnut-shaped adhesive washer has been interposed between the actuator arm and the suspension hub. When the suspension hub inserts into the actuator arm opening, heat is applied to melt the washer and thereby create a bond.

There are drawbacks to known adhesive attachment methods. Heating the doughnut-shaped washer melts the washer. As the washer melts, it deforms. This deformation can allow the suspension to misalign relative to the actuator arm, changing the suspension gram load. Another drawback of the adhesive washer is that the hub locates relative to the actuator arm tip to create a bond. When the actuator arm tips misalign, the suspension will also misalign. There is no provision for correcting for actuator arm tip variations that cause gram load variations. What is desired is a way of correcting fabrication misalignment and distortion errors to maintain a consistent gram load.

SUMMARY OF THE INVENTION

An actuator for pivoting a magnetic transducer of a hard disk drive includes an E-block having a pivot bearing, actuator arms formed as part of the E-block, and suspensions bonded to the actuator arms. Each actuator arm has an arm tip with a bonding surface. The suspensions have an integrated baseplate that adhesively attaches to the bonding surface of the actuator arm tip.

The E-block pivot bearing is used as an alignment reference when bonding the suspensions to the actuator arms. The baseplate and the actuator arm bonding surface define a gap therebetween. Adhesive bridges the gap between the suspension and the actuator arm and bonds the suspension to the actuator arm tip. Because the suspensions use the pivot bearing as a reference and the adhesive flows to bridge the gap, the adhesive cures into a shape that automatically compensates for component alignment errors including actuator arm tip variations, pivot bearing inner race run-out, E-block bore inaccuracies, and bearing installation error. Additionally, adhesive bonding avoids gram load changes associated with swaging. Improved gram load precision can be achieved with adhesive bonding.

The bonding surface of the actuator arm tip has numerous possible configurations. One configuration includes a recessed bonding surface that is planar. The bonding surface defines a channel extending between the top and the bottom of the actuator arm for adhesive to flow into, according to a variation of the invention. The channel holds adhesive to enable the suspension/actuator arm bond to resist shear forces. According to another aspect of the invention, the bonding surface has a raised portion. The raised portion may include posts, rails or texture to prevent shear.

A method of assembling a suspension to an actuator arm of a an E-block, in accordance with the present invention, eliminates distortion error caused by swaging, and compensates for other errors caused by pressing the pivot bearing into the E-block arm.

The method includes the step of first inserting a pivot bearing into the E-block, and then referencing the pivot bearing to align the suspension in a desired position. The suspension and the actuator arm define a gap in the desired position relative to the bearing. The next step is bonding the suspension to the actuator arm with an adhesive to fill the gap and to maintain the suspension in the desired position. Filling the gap with adhesive forms an adhesive bridge between the actuator arm and the suspension. This bridge enables orientation of the suspension to compensate for variations in the actuator arm tips, bearing bore or race run-out, and bearing installation error, for example.

In keeping with this invention, a pivot bearing defines an axis and a z-datum. In the novel method, the step of referencing includes referencing the axis and the z-datum to align the suspension with respect to the pivot bearing. According to another aspect of the invention, the step of referencing includes attaching an assembly fixture to the pivot bearing and holding the suspension with the assembly fixture. The step of attaching includes mechanically clamping the suspension, or applying a vacuum to the suspension to hold the suspension in the desired position with respect to the pivot bearing.

The step of bonding preferably includes the steps of maintaining the suspension in the desired position with respect to the bearing, interposing the adhesive between the actuator arm and the suspension, and curing the adhesive with ultraviolet light. Accordingly, the present invention eliminates gram load changes associated with the swaging process. Additionally, since the suspension does not require location with respect to the E-block, or actuator arm tip as in the prior art, variations in gram load and static attitude caused by arm tip height and angle variations during fabrication are eliminated. Furthermore, locating the suspension with respect to the actuator bearing eliminates bearing related variations such as inner race run-out, bore inaccuracies and bearing installation misalignment.

BRIEF DESCRIPTION OF THE DRAWINGS

The invention will be described in greater detail with reference to the drawings in which:

FIG. 4 is a perspective view of an actuator arm tip in accordance with the present invention.

FIG. 5 is a perspective view of another actuator arm tip in accordance with the present invention.

FIG. 6 is a perspective view of an alternative actuator arm tip in accordance with the present invention.

DETAILED DESCRIPTION OF THE INVENTION

Figure 1:
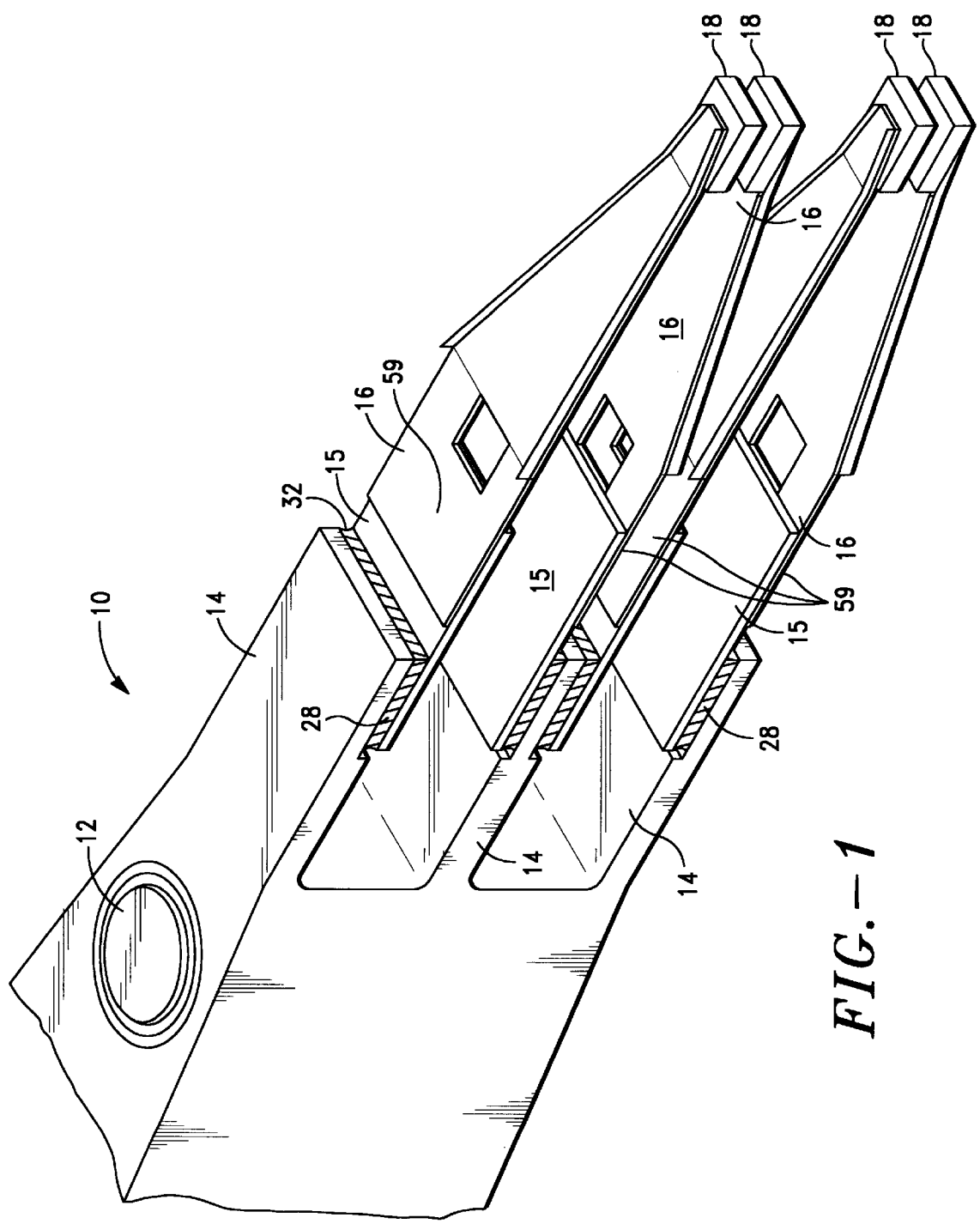
FIG. 1 is a perspective view of an E-block assembly.

In FIG. 1, an E-block 10 includes a pivot bearing 12, actuator arms 14, and suspensions 16. Each suspension 16 has an integral baseplate 15 at one end and a slider 18 at the other end. The slider 18 includes a magnetic transducer for reading and writing data to a hard disk drive.

The baseplate 15 of each suspension 16 and actuator arm 14 form an adhesive-fillable gap 32. The gap 32 fills with adhesive 28 to bond the baseplate 15 of the suspension 16 to the actuator arm 14. The adhesive 28 is selectively curable. Preferably, the adhesive 28 is ultraviolet light (UV) curable.

The baseplate 15 is a rigid planar component capable of attachment via a weld to the suspension. Once welded to the suspension 16, the baseplate 15 improves the rigidity of the suspension 16 to enable the suspension 16 to attach to an actuator arm 14. The baseplate 15 has an end portion that overhangs one end of the suspension 16. The other end portion of the baseplate 15 is bonded by the adhesive 28 to the actuator arm 14. The suspension has a locating surface 59 used in prior testing and measurement of gram load and attitude of the suspension, as well as locating the suspension to the E-block during the assembly process.

Figure 2:
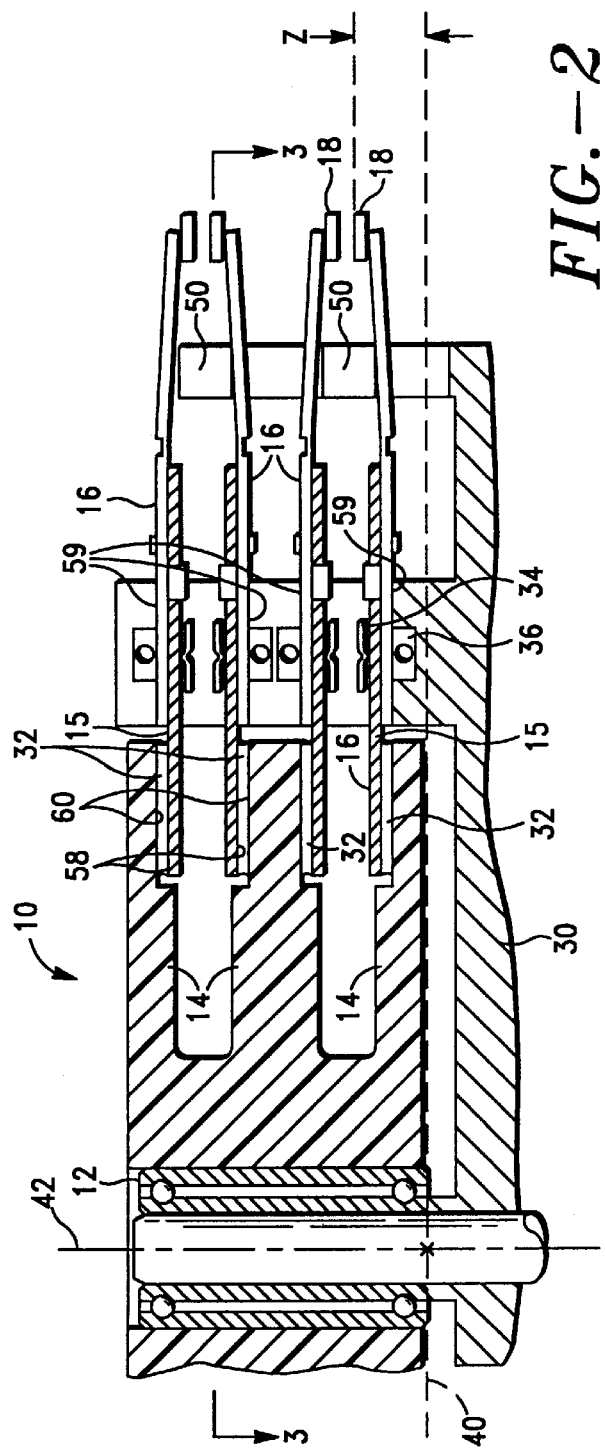
FIG. 2 is a cross-sectional side view of an assembly fixture holding an E-block assembly.

FIG. 2 shows the E-block 10. An assembly fixture 30 attaches to the pivot bearing 12 and holds each suspension 16 in a desired position. The assembly fixture 30 distances and orients each suspension 16 with respect to the pivot bearing 12. Accordingly, the assembly fixture 30 locates the suspension 16 with respect to the pivot bearing 12.

Each suspension 16 has a bonding surface 58. Each actuator arm 14 has a bonding surface 60. The bonding surface 60 of each actuator arm 14 and the bonding surface 58 of each suspension 16 form the gap 32. Adhesive 28, which may be an epoxy, fills the gap 32 to bond each suspension 16 to the actuator arm 14. Filling the gap 32 with adhesive enables the adhesive to cure into a shape that automatically corrects for component misalignment, including actuator arm 14 tip variations.

While the assembly fixture 30 holds the suspensions 16 and the pivot bearing 12 with a mechanical linkage, various other devices for holding the suspensions 16 during assembly can utilize the pivot bearing 12 as a reference. For example, a device that does not directly attach to the pivot bearing 12 can be used. An assembly fixture with an optical sensor, for example, can distance and orient the suspensions 16 with respect to the pivot bearing 12. A datum common to both the pivot bearing 12 and to the suspensions 16 may be used as an alignment reference instead of the pivot bearing 12 according to a variation of the invention.

The assembly fixture 30 includes mechanical clamps 34 and vacuum actuated clamps 36 for holding the suspensions 16 in a desired position and orientation with respect to the pivot bearing 12. Each suspension 16 includes a locating surface 59. The clamps 34 and 36 selectively hold each suspension 16 at the locating surface 59 during suspension/actuator arm 14 assembly.

The bonding method includes inserting the pivot bearing 12 into the E-block 10. The next step aligns the suspension 16 with respect to the pivot bearing 12, thus forming a gap 32 between the suspension 16 and an actuator arm 14. The next step includes interposing the adhesive 28 between the actuator arm 14 and the suspension 16 to fill the gap 32. After the adhesive 28 fills the gap 32, UV light cures the adhesive 28, bridging the gap 32. The adhesive 28 maintains the suspension 16 in the desired alignment with respect to the pivot bearing 12.

If the pivot bearing 12 and actuator arm 14 misalign for any reason bridging the gap 32 with adhesive 28 compensates for misalignment of the E-block and each actuator arm 14. Although mechanical and vacuum clamps 36 are used in combination, there are various clamp types, which may be substituted in accordance with the present invention. Additionally, vacuum clamps 36 may be used exclusively. In an alternative embodiment, mechanical clamps 34 may be used exclusively.

The pivot bearing 12 defines a z-datum 40 and an axis 42. The pivot bearing 12 is cylindrical in shape, having two ends, an inner race and an outer race. According to one aspect of the invention, the z-datum 40 is a line defined at one end of the pivot bearing 12, intersecting the axis 42 at a right angle. It can be appreciated that while the z-datum intersects the axis 42 at one end of the pivot bearing 12, the z-datum can also be arbitrarily fixed along another line, or at a point, to enable the suspensions 16 to align with respect to the pivot bearing 12.

The assembly fixture 30 holds each suspension 16 at a predetermined z-distance from the z-datum 40 and at a desired x-y position. Supports 50 hold the sliders 18 apart by separating the suspensions 16. The assembly fixture 30 holds the suspensions 16 in the desired position while the actuator arms 14 and suspensions 16 bond.

The axis 42 establishes a y-datum to distance the suspensions 16 from the bearing. The use of the assembly fixture 30 with a direct mechanical linkage between the pivot bearing 12 and the suspensions 16 fixes a desired distance between the pivot bearing and the suspensions. The assembly fixture 30 holds each suspension 16 at a predetermined distance from the axis 42 to establish the y position of the slider 18 during assembly of the suspensions 16 and the actuator arms 14.

The present invention can also apply to correcting undesired pitch and roll of the actuator arm 14. Since the suspension 16 does not mechanically lock on the actuator arm 14, as in the prior art, the suspension 16 is held by the assembly fixture 30 in the desired static orientation i.e. pitch and roll position when adhesively bonded to the actuator arm 14.

Figure 3:
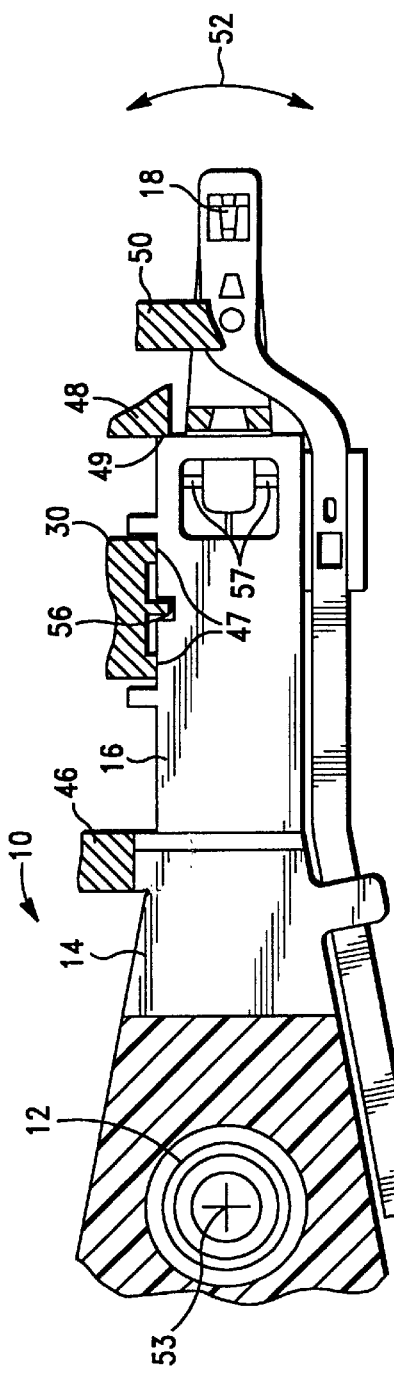
FIG. 3 is a view of the E-block assembly and assembly fixture as seen along the section line 3—3 of FIG. 2.

FIG. 3 shows a sectional view of the E-block 10 of FIG. 2. The pivot bearing 12 normally enables the E-block 10 to pivot along the arc 52. The suspension 16 includes the locating surface 59 and piezoelectric element 57 for fine positioning of the air bearing slider 18 during operation. The assembly fixture 30 includes discrete supports 46, 48 and 50. The support 46 prevents rotation of the E-block. The support 48 prevents extension of the suspension 16 from the E-block 10. The supports 50 hold the air bearings 18 apart (FIG. 2). The fixture 30 firmly holds the locating surface 59 to prevent any movement of the suspension 16.

The pivot bearing 12 defines a datum point 53. The support 46 contacts the actuator arm 14 to align the actuator arm 14 with respect to the pivot bearing 12, and particularly with respect to the datum point 53, and to prevent rotation of the E-block in the direction of the arc 52. The support 48 locates and holds the suspension 16 at point 49. The fixture 30 also locates the suspension at the points 47. Points 47 locate the suspension 16 in the transverse direction. The locate point 56 has a perimeter defining a recess for engaging the assembly fixture 30, as an alternative to support 48 for longitudinal location of the suspension 16.

The fixture 30 may have any of a variety of mechanical alignment features, which can take various shapes and sizes. Various non-mechanical alternatives exist. It can be appreciated that optical verification of alignment can be used. Additionally, various suspensions eliminating various features, or containing features such as micro-actuator, chip-on-suspension, shock limiters and the like may be used.

FIG. 4 shows a tip 20 of an actuator arm 14. The tip 20 includes a top 64, a bottom 66, two lateral sides 70, and a bonding surface 60 on the top 64. The bonding surface 60 defines four channels 68 extending between the top 64 and the bottom 66. The channels 68 have a dove-tail shaped cross-section and extend fully across each lateral side 70 from the top 64 and the bottom 66. The channels 68 are configured to fill with flowing adhesive. Flowing adhesive in the channels 68 prevents lateral movement of the adhesive (towards the lateral sides) and thereby prevents the suspension 16 from shearing away from the actuator arm 14 during use.

Although lateral channels 68 are shown, the channels 68 can be formed within the bonding surface 60 and may have various cross-sectional shapes including a circular cross-sectional shape. The channels 68 extend partially through the tip 20 of the actuator arm 14 according to a variation of the invention.

FIG. 5 shows another tip 20 of an actuator arm 14. The end includes a bonding surface 60 with raised portions, namely four posts 72 defined on each lateral side and extending perpendicular from the top 64 and the bottom 66. The bonding surface 60 has a generally rectangular periphery. The posts 72 define corners of the generally rectangular periphery of the bonding surface 60 to provide shear resistance and the raised portions prevent the suspension 16 from shearing away from the actuator arm 14.

The posts 72 have a generally rectangular cross-sectional shape and squared ends. The posts 72 may take any of a number of shapes and, for example, may have tapered ends, or rounded ends. Further, the number and location of the posts 72 may be modified in accordance with the present invention.

FIG. 6 shows an alternative tip 20 of the actuator arm 14. The bonding surface 60 includes raised portions, namely rails 76 extending from each bonding surface 60 on each lateral side 70, and texture 80. The rails 76 and texture provide shear resistance and prevent the adhesive bonded to the bonding surface 60 from shearing. According to one aspect of the invention, the texture 80 includes parallel ridges.

Figure 7:
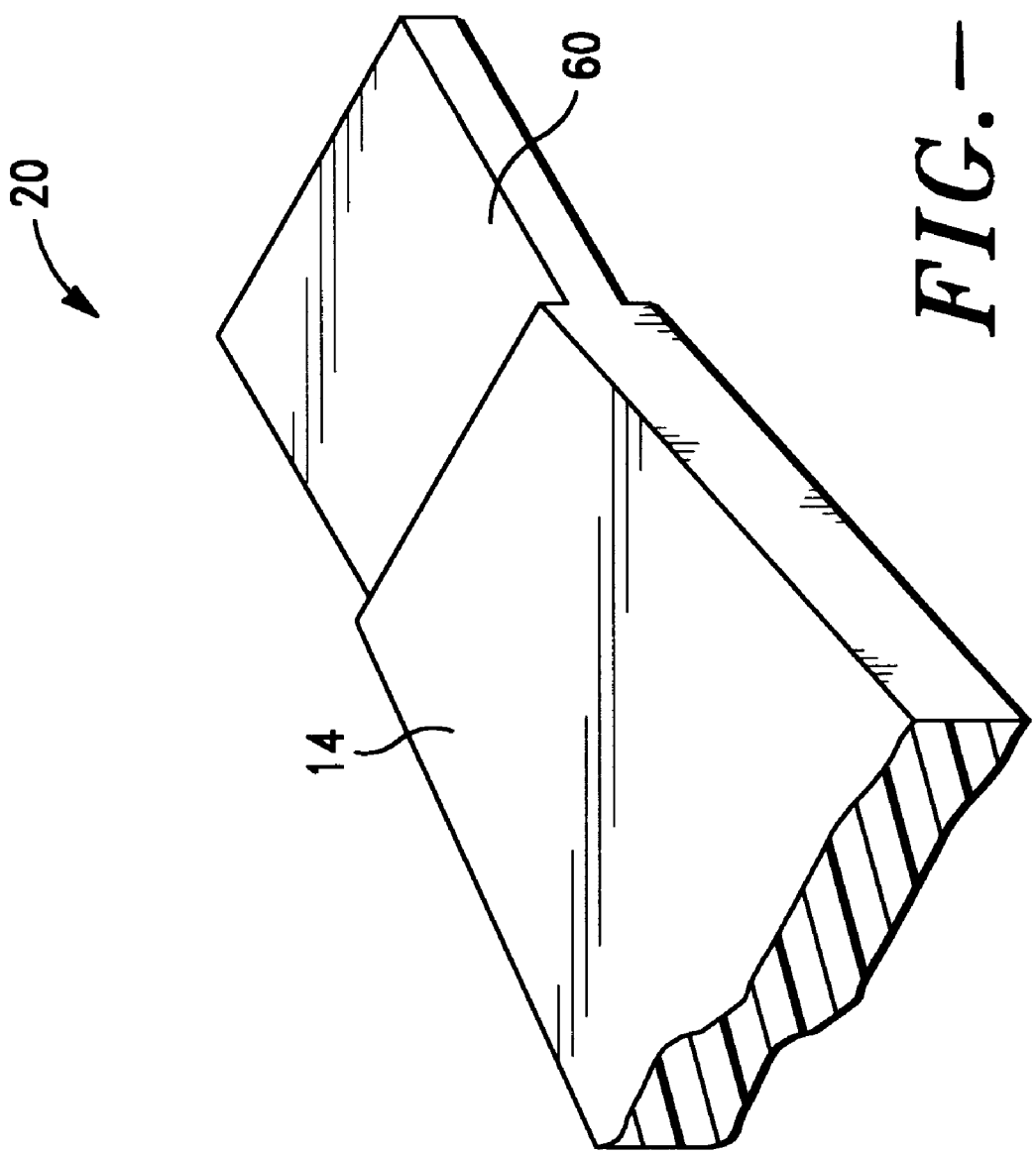
FIG. 7 is a perspective view of another alternative actuator arm tip in accordance with the present invention.

FIG. 7 shows another alternative tip 20 of the actuator arm 14. The bonding surface 60 is planar and recessed from the actuator arm 14. Alternatively, the bonding surface may not be recessed.

Various modifications, additions and variations of the apparatus and method can be made within the scope of the invention. For example, the texture 80 can assume any of a number of texture patterns to hold adhesive. Additionally the baseplate 15 of the suspension 16 can have a textured or raised bonding surface for holding adhesive. The various raised portions of the actuator arm 14 bonding surface 60 can assume any of a number of configurations.

What is claimed is:

1. An apparatus for attaching a head suspension to an actuator arm for use in a disk drive comprising:
    an E-block formed with a pivot bearing having horizontal and vertical axes;
    a plurality of actuator arms, each of said arms having an end with a bonding area;
    a plurality of suspensions, each having first and second ends and a locating surface, said suspensions being positioned and fixed relative to said horizontal and vertical axes of said pivot bearing;
    air bearing sliders mounted respectively at the first end of each suspension, and a planar locating surface at the second end of each suspension;
    a plurality of baseplates joined respectively to said plurality of suspensions, each baseplate having a bonding surface;
    wherein the bonding surface of each baseplate and a corresponding bonding area of each actuator arm define a gap;
    an assembly fixture attached to said pivot bearing for orienting and holding each of said head suspensions in a fixed position relative to the said horizontal and vertical axes; and
    an adhesive material disposed in said gap for bonding each baseplate to a corresponding actuator arm while said head suspensions are held in a fixed position.

2. An apparatus as in claim 1, wherein said locating surface of each of said suspensions is in a planar relation with said adhesive gap.

3. A apparatus as set forth in claim 1, wherein each suspension includes a piezoelectric element for fine positioning of the air bearing slider.

4. An apparatus as set forth in claim 1, wherein the actuator arm bonding surface includes a raised portion.

5. An apparatus as set forth in claim 4, wherein the raised portion includes a post.

6. An apparatus as set forth in claim 4, wherein the raised portion includes rails.

7. An apparatus as set forth in claim 1, wherein the actuator arm bonding surface are textured.

8. An apparatus as set forth in claim 1, wherein the actuator arm bonding surface are recessed.

9. A apparatus as set forth in claim 1, wherein each suspension includes a locate point having a perimeter that defines a recessed portion for engaging the assembly fixture.

10. A method of assembling a suspension with an actuator arm of an E-block comprising the steps of:

providing an E-block with a pivot bearing;

attaching an assembly fixture to said pivot bearing;

aligning the suspension with respect to the pivot bearing and forming a gap between the suspension and the actuator arm;

clamping the suspension with clamps of said assembly fixture; and bonding the suspension to the actuator arm by filling the gap with an adhesive while maintaining the suspension in a given position, whereby filling the gap with adhesive aligns the suspension with the pivot bearing notwithstanding possible misalignment of the actuator arm.

11. A method as set forth in claim 10, wherein clamping the suspension with the assembly fixture includes applying a vacuum to the suspension.

12. A method as set forth in claim 10, wherein the pivot bearing defines an axis, and the step of aligning the suspension with respect to the pivot bearing includes positioning the suspension with respect to said axis.

13. A method as set forth in claim 10, wherein the step of bonding includes curing the adhesive with ultraviolet light.

* * * * *